Aug. 9, 1966     P. L. LINDQVIST     3,265,550
PROCESS OF MAKING A PACKING UNIT OF MOISTURE ABSORBENT
CELLULOSIC MATERIAL

Filed Nov. 3, 1964     2 Sheets-Sheet 1

INVENTOR.
PER LENNART LINDQVIST

BY

ATTORNEY 3,265,550
PROCESS OF MAKING A PACKING UNIT OF MOISTURE ABSORBENT CELLULOSIC MATERIAL
Per Lennart Lindqvist, Danderyd, Sweden, assignor to Carl Munters & Co., Stocksund, Sweden, a partnership
Filed Nov. 3, 1964, Ser. No. 410,821
Claims priority, application Sweden, July 10, 1957, 6,477/57
2 Claims. (Cl. 156—210)

The present invention relates to gas and moisture contact apparatus and more particularly to a resin-impregnated packing material or "fill" for cooling towers, humdifiers or evaporating air coolers and the like, and to a method of impregnation of said material to produce the desired wet strength while maintaining the material moisture absorbent.

This application is a continuation-in-part of my copending application Serial No. 747,431, filed July 9, 1958 now abandoned.

The type of gas and liquid contact apparatus to which the invention is particularly applicable comprises a plurality of intermediate passages or tubular cells open at both ends in which a moisture and gas, such as water and air, are brought into direct contact with each other whereby the water is cooled by evaporation of moisture into the air flowing through the passages. A contact apparatus of this kind is shown, for example, in United States Patents Nos. 2,809,817 and 2,809,818.

The undulating folds of accordion-pleated or corrugated sheets disposed between flat sheets, provide the spacing of the partition walls of each cell and the end portions of the assembled sheets provide large areas through which the moisture or liquid enters and leaves the packing or fill.

The heat and moisture transfer efficiency of the packing per unit of volume becomes greatly enhanced by making the packing or "fill" of highly moisture-absorbent material so that the liquid flows uniformly over the surface in a thin film and continuously wets the partition walls. This requirement becomes particularly important when the cells or passages have a very small cross-sectional area. This is desirable in order to increase the transfer area of the partition walls per unit of volume of the packing and to produce a more intimate contact between the gas and the liquid.

Not only is the initial capacity of the packing or "fill" affected by the absorbent characteristics of the packing or "fill" but also its durability. During the evaporation of water from the packing, the concentration of impurities, such as mineral material, increases. Unless the entire surface area of the packing is regularly and continually flushed by the water flowing down the partition walls a scale deposit will be built up by the evaporation which finally may plug the packing entirely and render it useless unless subjected to continuous flushing.

Organic fibrous materials have been found preferable, but these materials do not have the durability and wet strength of metal.

It is, therefore, among the objects of the present invention to produce a packing or "fill" of a thin, fibrous, lightweight, low cost material, which is sufficiently absorbent to cause an even and uniform distribution of the moisture over the entire surface area of the packing and which has the necessary wet strength to support itself as well as the weight of moisture passing through it.

A further object of the invention is to provide a packing which, by means of its construction and method of manufacture, will withstand the deleterious effects of mold, algae, fungus and bacteria which are encountered under various geographical and climatic conditions.

Other objects and advantages inherent in the invention will become apparent from the following description when taken in conjunction with the accompanying drawings, in which FIG. 1 is a perspective fragmentary view of one form of "fill" or packing unit according to the invention with dimensions distorted for clearness;

Figure 1:
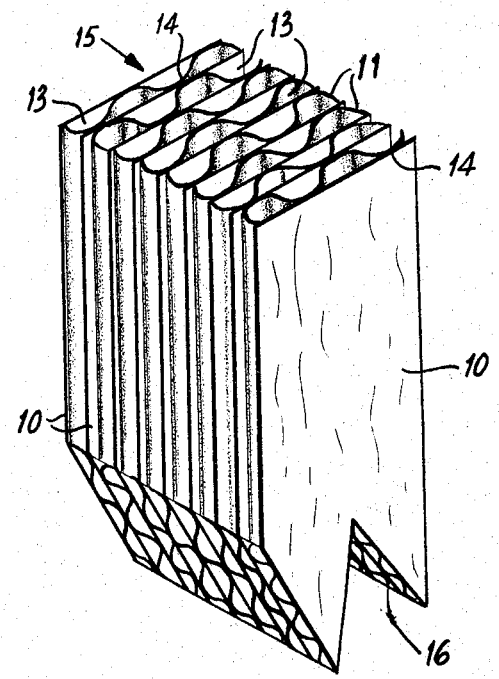

In terms of broad inclusion, the invention includes the impregnation of a web of fibrous material with a water soluble thermosetting resin, such as a phenol-formaldehyde emulsion or solution, then corrugating the resin-bearing web, and thereafter curing the web to set the corrugations.

As shown in the drawing the packing or "fill," generally indicated at 15, includes superimposed flat sheets 10 and corrugated sheets 11, joined by a suitable adhesive along their points or lines of contact 14.

In the embodiments shown in the drawing the alternating flat sheets 10 and corrugated sheets 11 are stacked in adjacent face to face relationship to form a rectangular unit.

Figure 2:
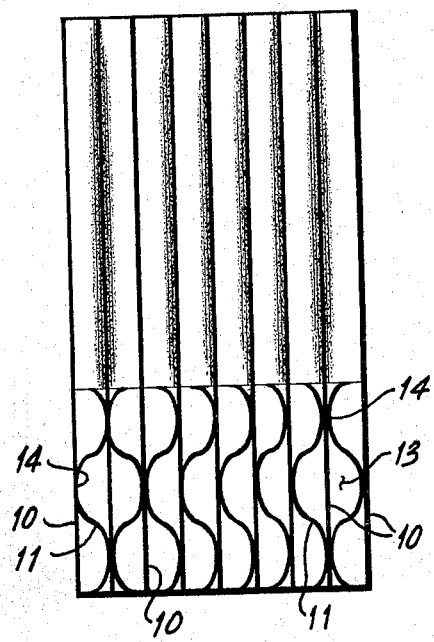
FIG. 2 is a fragmentary view on a larger scale.

The superimposed sheets 10 and 11 for some devices may be rolled into a circular shape to form a flat-faced wheel as shown in FIG. 2 of Patent No. 2,809,818.

The stacked sheets 10 and 11 provide pipe-like channels or cells 13 lying in the spaces between adjacent sheets 10, and these channels extend throughout the packing and are open at both ends.

The sheets are made of any suitable thin fibrous material which is highly moisture absorbent, such as sheets composed of cellulose or paper. When the packing is used in an air conditioning apparatus it may be composed of paper.

The sheets may be as thin as $\frac{1}{10}$ millimeter. Such paper is extremely light in weight and low in cost compared to materials heretofore used in analogous devices.

The distance between the flat sheets, or in other words, the height of the corrugations in the sheets 11 may vary for particular conditions of application. The closer the spacing of the sheets, the greater the surface area per unit of volume of the "fill" and the more effective the intimate contact of the liquid and the gas.

On the other hand, as the distance between the sheets decreases, the resistance to the flow of air through the cells increases and the cells are more likely to become plugged by dirt, mineral scale or liquid bridging the cells by surface tension.

In most cooling tower installations the spacing between the flat sheets is about 3 to 8 millimeters, but may be increased beyond this range. On the other hand, when the packing is applied to an air conditioning system the spacing may be as narrow as about 1 millimeter.

The corrugations seem to provide the most effective cells when they curve to approximate a sine wave and have a wave length up to twice the height of the undulations.

When used in a cooling tower installation, water is usually delivered on the top of the packing by a suitable spraying device, not shown. The water is uniformly distributed throughout the packing by the vertical partition walls formed by the alternating flat and corrugated sheets 10 and 11 which divide the sheet of water and guide it to fall vertically by gravity down the side walls of the cells 13 in the form of thin films.

A conventional fan, not shown, may be mounted in any suitable location to impel air through the packing. The water cooled by the packing flows to a sump, not shown, from which it is conducted to the place where it is to be used.

The paper from which the packing preferably is composed is given characteristics which usually are not present in the commercial grades of paper on the market.

As previously mentioned, the paper must be highly absorbent, like blotting paper. Paper of this this type has practically no wet strength. On the other hand, many kinds of paper possess a high wet strength but are too poorly water absorbent if not actually water repellant.

The stock from which the paper is produced should be first thoroughly cooked down to a low "Roe" number in order to obtain the best results.

The "Roe" index, named after the American inventor of that name, is a measure of the amount of resistance to decomposition and aging by removal of lignins.

The more the stock is cooked the more lignins are removed. The "Roe" index measures the amount of chlorine taken up by 2 grams fo stock in 15 minutes.

The pulp needs to be refined only to a slight degree. For instance, a sulphate pine pulp after the cooking process may have fibers of the order of three to four millimeters in length. In other words, the pulp should not be hydrated or only slightly hydrated. It should be free of crushed fiber particles or other substances which tend to collect in the interstices between the long fibers and reduce the water absorbent capacity of the paper. Therefore, it is best to refine the pulp only to about 20° SR.

Normally, paper is given wet strength by a glue size or by adding resin or a resin material to the stock during the pulp production and chemically precipitating that on the fibers. This procedure, however, has the disadvantage that it reduces the moisture absorbent quality of the paper if the sizing material is added in sufficient quantity to obtain the desired wet strength.

The inventor has discovered that by impregnating the paper after it has been manufactured with a solution of certain chemicals and by thereafter evoporating the solvent, it is possible to obtain a web of high wet strength while maintaining and even improving the water absorbing characteristics of the paper.

The difference in water absorbent characteristics between chemicals applied to the paper in this way and chemicals added to the stock at the wet end of the wire arises partly from the difference in deposit of the chemicals in the fibers. However, the chemicals cannot be added to the stock at the wet end of the wire by evaporation because of the large losses of chemicals to the water, which is removed at this stage.

Water soluble phenol-formaldehyde added to the paper web preserves the desired water absorbent characteristics of the paper in a very high degree after subsequent curing. Phenol-formaldehyde resin appears to be hydrophilic at least to such an extent that an impregnation of the paper web with this material will sustain a continuous film of liquid.

The impregnation of the paper with such a solution is carried out so that the paper can pick up large amounts of the solution, as for example up to 30% by weight yielding a paper with very high wet strength and which retains its absorptive capacity almost unaltered.

The phenol resin retained in the paper of the present invention should be between 7% and 15% by weight and should not exceed 30%.

According to the present invention the paper web is impregnated with phenol-formaldehyde resin *before* the web has been corrugated for forming the cellular structure, but the resin is not cured substantially until *after* the corrugation process.

A paper web unwound from a roller brought into contact with a 7% to 8% water solution of phenol-formaldehyde material picks up more than its own weight of the solution, which means that the resin content after the web is dried is greater than in the solution and may be 9% to 10%.

The paper may then be dried flat without curing upon a cylinder at a temperature of 120° C. to 140° C. The contact with the cylinder is continued only long enough to evaporate water so that the resin is not cured in any substantial degree.

Preferably the web is carried over a cold cylinder or roller after the drying to cool it after the evaporation operation. Thus impregnated paper may be stored in roll form for a considerable period at ordinary room temperature without curing.

The packing described herein may be constructed from the impregnated and dried web. The paper web is corrugated in a corrugating apparatus of any suitable conventional type where it may be simultaneously glued to a flat paper sheet.

The adhesive glue may consist of solution of waterglass or other suitable soluble material which become insoluble under the subsequent heat curing of the resin. It will be noted that the phenol-formaldehyde incorporated in the paper is continuous under the glue, thus there is no weakness where the corrugations lie against adjacent sheets.

The two joined sheets may be cut to size, superposed on other such pairs of sheets, glued by the same adhesive.

Then the resin is finally cured and set in a kiln in which air of a tempreature of 150° C. to 160° C. is blown through the cells of the constructed body or unit for about 15 minutes, hardening both the resin and silicate or other glue, fixing the fibers and permanently setting the corrugations.

It is important that the corrugation of the paper takes place before complete curing of the phenol-formaldehyde resin. By the curing, the paper becomes more or less resilient and unless cured after currugating, the currugations would not hold their shape, but endeavor to spring out and cause the adjacent sheets to separate. In the cured finished packing unit the corrugatings thus are fixed in shape so that the undulations will be retained even if adjacent superposed layers become separated.

The finished unit for use in a cooling tower consisting of stacked superposed layers of flat and corrugated paper bound together by adhesive is cut or sawed to final shape and which may include a series of drainage tips 16 to insure continuous drainage.

By reason of the fact that the passages or cells may have such a small cross section that the water by surface tension may bridge between the walls, it is important to prevent the cell openings from being choked by swelling of the fibers or by deformation of the packing unit. It is recognized that when the distance between the flat sheets in a packing of cellular structure is only 4 mm., as indicated in U.S. Patent No. 2,809,818, or even smaller, choking of the cell openings will impair the flow of the two media passing through the cells. This is particularly so at the side where the water is discharged when the packing is applied to a cooling tower installation in which the water and air flow counter-current to one another and are provided with the downwardly extending serrations in order to eliminate the effect of the surface tension and prevent plugging. It has been shown that by reason of the relatively large amounts of the heat cured plastic substances, such as phenol-formaldehyle resin or its equivalent, which are used according to the invention, the paper acquires such a durability and strength and the fibers acquire such a spryness that when cutting and trimming the packing the edges will be smooth and sharp and the cell openings will not be deformed.

Although the packing has been described as being composed of alternating flat sheets and corrugated sheets, it should be understood that all of the sheets making up the packing may be corrugated, without departing from the invention.

Copper and other preservative materials as well as dye pigments are added in the beater.

Although the foregoing describes the invention as applied to a corrugated structure it should be understood that it is applicable with equal advantage to a so-called honeycomb structure. In the latter case a plurality of superposed impregnated sheets are glued or otherwise joined at spaced intervals and the unattached intermediate portions expanded so as to form a fluted cellular structure.

The packing material used for air conditioning apparatus or for gas and liquid apparatus for industrial purposes may be modified by adding to the pulp, from which the web is made, asbestos and/or glass fibers, to make the "fill" more resistant to heat and chemicals.

Actual experience has shown that many cooling tower packings collapsed completely after only a few months of use. These collapsed pads or packings were first built up into a stacked structure and thereafter impregnated with a phenolic resin. The remedy for this failure has been attained by the present invention. Packings made according to the invention have been used for several years without any appreciable evidence of damage or deterioration.

Figure 3:
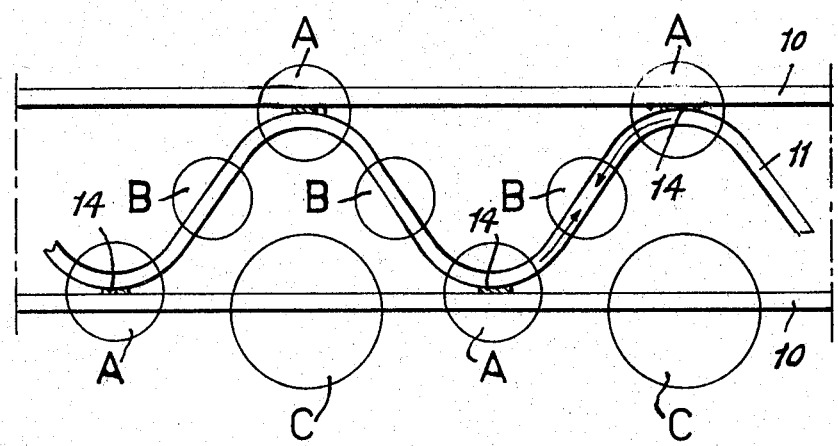
FIG. 3 is a diagrammatic view illustrating how the present invention produces a construction that is resistant to the effects of micro-organisms.

The unexpected result derived from the invention is explained as follows, with reference to FIG. 3:

It will be noted from FIG. 3 that the cellulose paper sheets 10, 11 are glued together in the zones A. It was found that the packings made before this invention, separated and collapsed at these points, probably due to attacks by micro-organisms. When the packing was made according to the old and known method, that is impregnated *after* the formation of the unit, it had to be dried and the phenolic resin was cured by blowing hot air through the cells. In the zones B and C the individual sheets were exposed on both sides to the drying air. The evaporation, therefore, took place much quicker in zones B and C than in zones A. As a result, phenolic resin solution was sucked from the zones A to the zones B and C as indicated by the arrows. This in turn resulted in the phenolic resin being more concentrated in zones B and C than in zones A which latter became underimpregnated. The resistance against attacks by micro-organisms depends upon the degree of impregnation with the phenolic resin and since zones A lacked sufficient phenolic resin, they became exposed to these micro-organisms, with the result that the sheets collapsed and separated at these points. By impregnating and drying the sheets *before* they are formed into a stacked fluted structure, any suction of resin from the zones A to the zones B and C cannot take place and the sheets remain homogeneously impregnated with sufficient amount of the resin to withstand the attacks by micro-organisms.

Having thus described a single embodiment of the invention, it is obvious that the same is not to be restricted thereto, but is broad enough to cover all methods or structures coming within the scope of the annexed claims.

What I claim is:

1. The process of making a packing unit of moisture-absorbent cellulosic material for use in a gas and liquid contact apparatus in order to increase the wet strength of the packing while maintaining its liquid absorbent characteristics, which comprises the steps of impregnating a web of said cellulosic material with a substantial quantity of an aqueous solution of a phenol-formaldehyde thermosetting resin, drying said web at a temperature below the final curing temperature of said resin to avoid any substantial curing of the resin, forming said web into uncured corrugated sheets, applying adhesive to the apices of said corrugations of each sheet, superposing each thus treated corrugated sheet on a similarly impregnated cellulosic sheet, and forming a stacked structure having a mass of adjacent peripherally enclosed tubular cells open at both ends to allow gas and liquid to flow through the cells, and subjecting said stacked structure to final curing temperatures to cure said resin, set said corrugations, and harden said adhesive to thereby unite said sheets and form said stacked structure into a packing unit.

2. In the process of claim 1 and wherein said similarly impregnated cellulosic sheet is flat, the step of alternating the flat sheets with the corrugated sheets to provide said stacked structure.

References Cited by the Examiner

UNITED STATES PATENTS

| | | | |
|---|---|---|---|
| 2,518,164 | 8/1950 | Meyer | 161—137 |
| 2,547,880 | 4/1951 | Meyer et al. | 156—201 |
| 2,687,447 | 8/1954 | Merril. | |

EARL M. BERGERT, *Primary Examiner.*

H. F. EPSTEIN, *Assistant Examiner.*